(12) United States Patent
Lu et al.

(10) Patent No.: US 10,220,712 B2
(45) Date of Patent: Mar. 5, 2019

(54) CHARGING PILE

(71) Applicant: MiiCs & Partners (Shenzhen) Co., Ltd., Shenzhen (CN)

(72) Inventors: Pen-Uei Lu, New Taipei (TW); Wei-Chih Hsu, New Taipei (TW); Jin-Yu Ko, New Taipei (TW); Te-Kai Tseng, New Taipei (TW); Chao-Yang Huang, New Taipei (TW); Da-Yu Wu, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/408,609

(22) Filed: Jan. 18, 2017

(65) Prior Publication Data
US 2018/0201143 A1    Jul. 19, 2018

(51) Int. Cl.
*H02J 7/00* (2006.01)
*B60L 11/18* (2006.01)

(52) U.S. Cl.
CPC ................................ *B60L 11/1816* (2013.01)

(58) Field of Classification Search
CPC ....... Y02E 60/12; H02J 7/0042; H02J 7/0045; H01M 10/46; H01M 10/44

USPC ......................................................... 320/107
See application file for complete search history.

(56) References Cited

U.S. PATENT DOCUMENTS

| | | | | |
|---|---|---|---|---|
| 2013/0153257 | A1* | 6/2013 | Yamamaru | B60L 11/1818 174/67 |
| 2013/0338820 | A1* | 12/2013 | Corbett | B60L 11/1824 700/232 |
| 2015/0104961 | A1* | 4/2015 | Bito | B60L 11/1818 439/142 |
| 2015/0139761 | A1* | 5/2015 | Qi | B60L 11/1835 414/253 |
| 2016/0083981 | A1* | 3/2016 | Kondo | B60K 1/04 49/31 |
| 2016/0087375 | A1* | 3/2016 | Yoshizawa | B60K 1/04 439/345 |
| 2017/0364995 | A1* | 12/2017 | Yan | G06Q 30/0645 |
| 2018/0105055 | A1* | 4/2018 | Chai | B60L 11/1818 |

* cited by examiner

*Primary Examiner* — Arun C Williams
(74) *Attorney, Agent, or Firm* — ScienBiziP, P.C.

(57) ABSTRACT

A charging pile includes a case and a charging gun base. The charging gun base is received in the case. The charging gun base is exposed from a side of the case. The charging gun base further includes a cover and a snap unit. The cover is coupled onto the case through the snap unit. The cover is rotatable relative to the case, thereby covering or exposing the charging gun base. When covering, the cover renders the charging gun base waterproof.

14 Claims, 7 Drawing Sheets

CHARGING PILE

FIELD

The subject matter relates to a charging pile, and particularly relates to a charging pile for an electric vehicle.

BACKGROUND

With electric vehicles, various charging piles are widespread. A charging pile is generally operated outdoors. If the waterproof effect of the charging pile is not good, leakage and electric shocks cannot be avoided.

BRIEF DESCRIPTION OF THE DRAWINGS

Implementations of the present technology will now be described, by way of example only, with reference to the attached figures.

DETAILED DESCRIPTION

Figure 1:
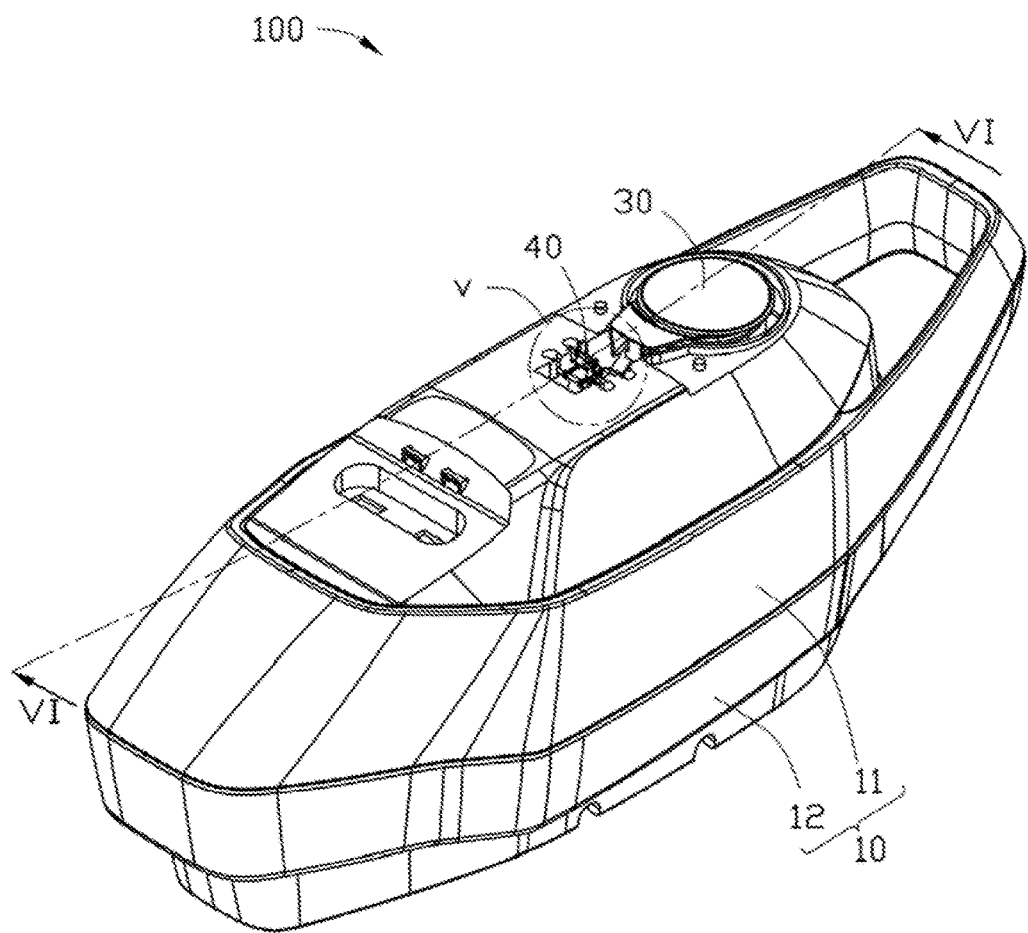
FIG. 1 is a schematic view of an assembly charging pile in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
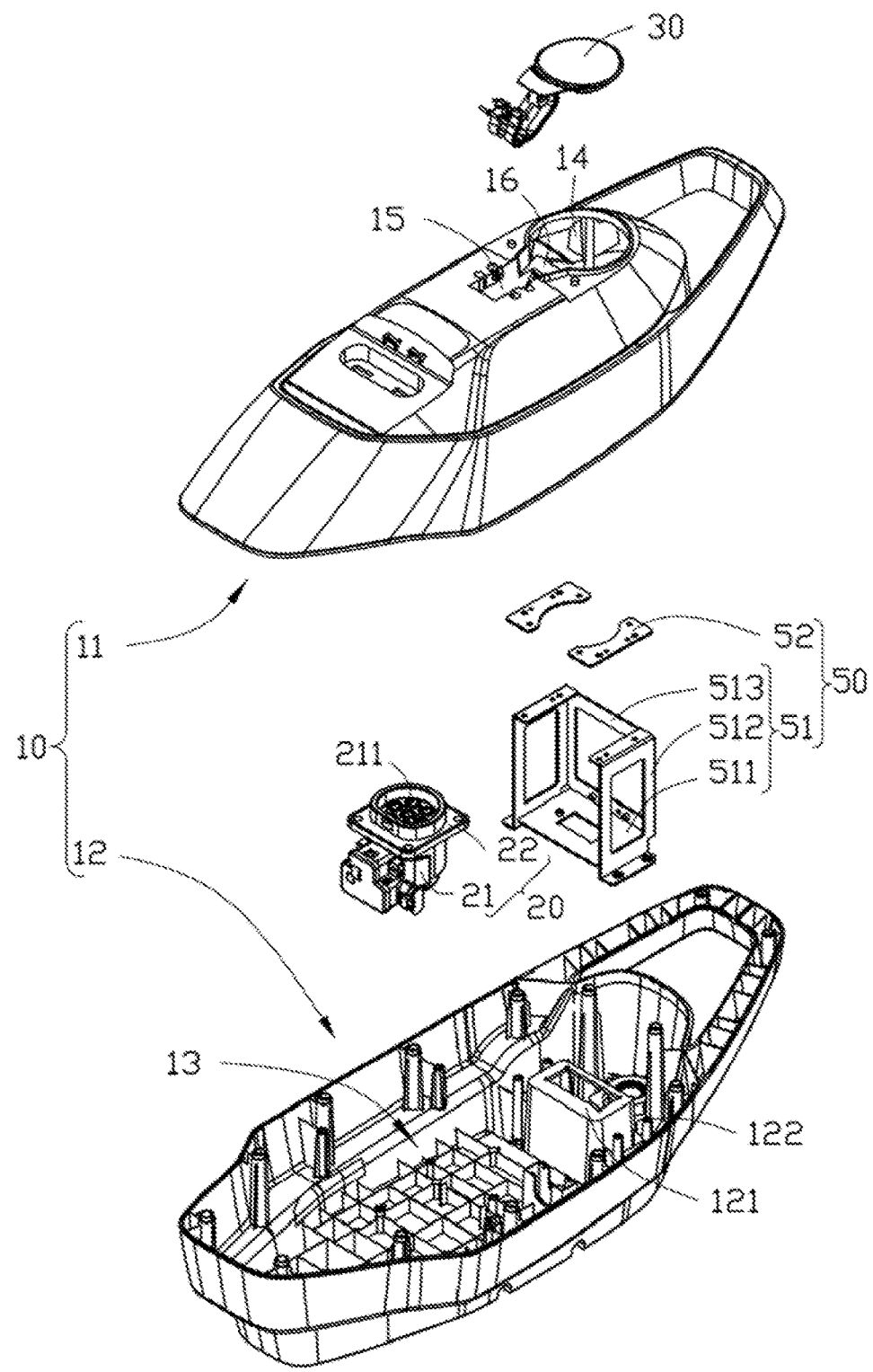
FIG. 2 is an exploded, isometric view of the charging pile in FIG. 1.

Referring to FIG. 1 and FIG. 2, the charging pile 100 of an exemplary embodiment of the present disclosure includes a case 10, a charging gun base 20, a cover 30, and a snap unit 40. The charging gun base 20 is received in the case 10. The charging gun base 20 is exposed at a side of the case 10. The cover 30 is mounted on the case 10 through the snap unit 40. The cover 30 is rotatable relative to the case 10. The cover 30 is configured to cover or to expose the charging gun base 20.

Referring to FIG. 2, the case 10 includes a front shell 11 and a rear shell 12. The front shell 11 and the rear shell 12 are mounted together. A cavity 13 is defined between the front shell 11 and the rear shell 12. The cavity 13 is configured to receive the charging gun base 20 and other necessary components (not shown). In this exemplary embodiment, the charging gun base 20 is mounted in the rear shell 12. The charging gun base 20 is positioned inside the rear shell 12 and is exposed from the front shell 11. An opening 14 is defined on the front shell 11. The opening 14 is configured to expose the charging gun base 20. The cover 30 is mounted on the front shell 11 to cover or to uncover the opening 14.

A chamber 15 is defined on the front shell 11 away from the rear shell 12. The snap unit 40 is mounted and received in the chamber 15. The chamber 15 is recessed inwards from an outside surface of the front shell 11. The chamber 15 is adjacent to the opening 14. A baffle 16 is provided to separate the opening 14 and the chamber 15.

The rear shell 12 further includes a seat 121 and a plurality of columns 122. The seat 121 and the columns 122 are configured to support and position the charging gun base 20. The seat 121 is positioned under the charging gun base 20. The columns 122 surround the seat 121. In the exemplary embodiment, the seat 121 is substantially rectangular. Preferably, the seat 121 is hollow.

The charging gun base 20 includes a main body 21 and a plate 22. A charging port 211 is defined on the main body 21. The charging port 211 faces the opening 14. The plate 22 extends outwards from a peripheral surface of the main body 21. The plate 22 is substantially flat and square. The main body 21 is mounted in the rear shell 12 through the plate 22. The plate 22 is positioned on the columns 122. The main body 21 is supported by the seat 121.

The charging pile 100 further includes a holder 50. The holder 50 is positioned in the cavity 13. The charging gun base 20 is mounted in the rear shell 12 through the holder 50. The holder 50 is fastened on the columns 122 and is supported by the seat 121.

The holder 50 includes a frame body 51. The frame body 51 is substantially a rectangular frame. The charging gun base 20 is received and mounted in the frame body 51. The frame body 51 includes a bottom plate 511, two end plates 512, and a side plate 513. The bottom plate 511 is flat and substantially rectangular. The two end plates 512 are mounted at opposite ends of the bottom plate 511. The side plate 513 connects the bottom plate 511 and the two end plates 512. The two end plates 512 are mounted on the columns 122. The bottom plate 511 is supported by the seat 121. The plate 22 of the charging gun base 20 is mounted on the two end plates 512. The main body 21 of the charging gun base 20 is hung upon the bottom plate 511.

Preferably, the holder 50 can further includes at least one mounting plate 52. In the exemplary embodiment, the holder 50 includes two mounting plates 52. Each mounting plate 52 is mounted on one of the two end plates 512. The two mounting plates 52 are opposite to and face each other. The two mounting plates 52 surround the main body 21 of the charging gun base 20. The plate 22 of the charging gun base 20 is mounted on the two mounting plates 52.

Figure 3:
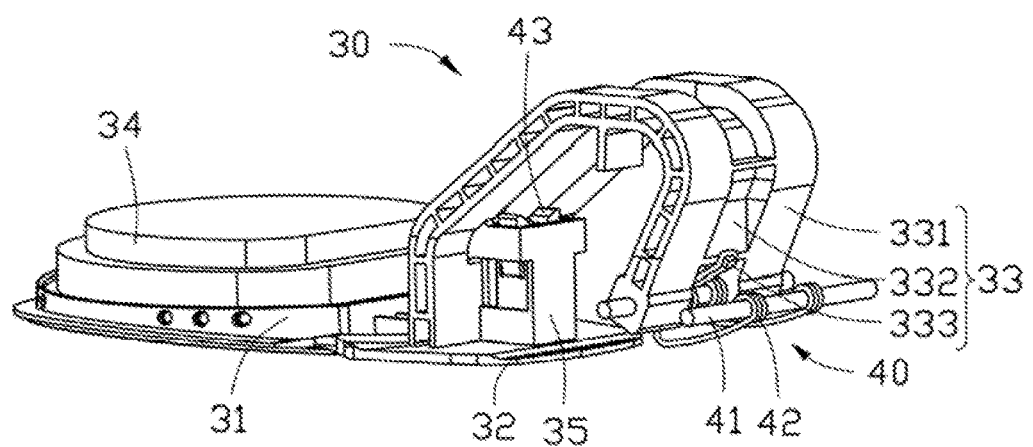
FIG. 3 is a schematic view of an assembly cover and a snap unit of the charging pile similar to FIG. 2, but viewed from another aspect.
Figure 4:
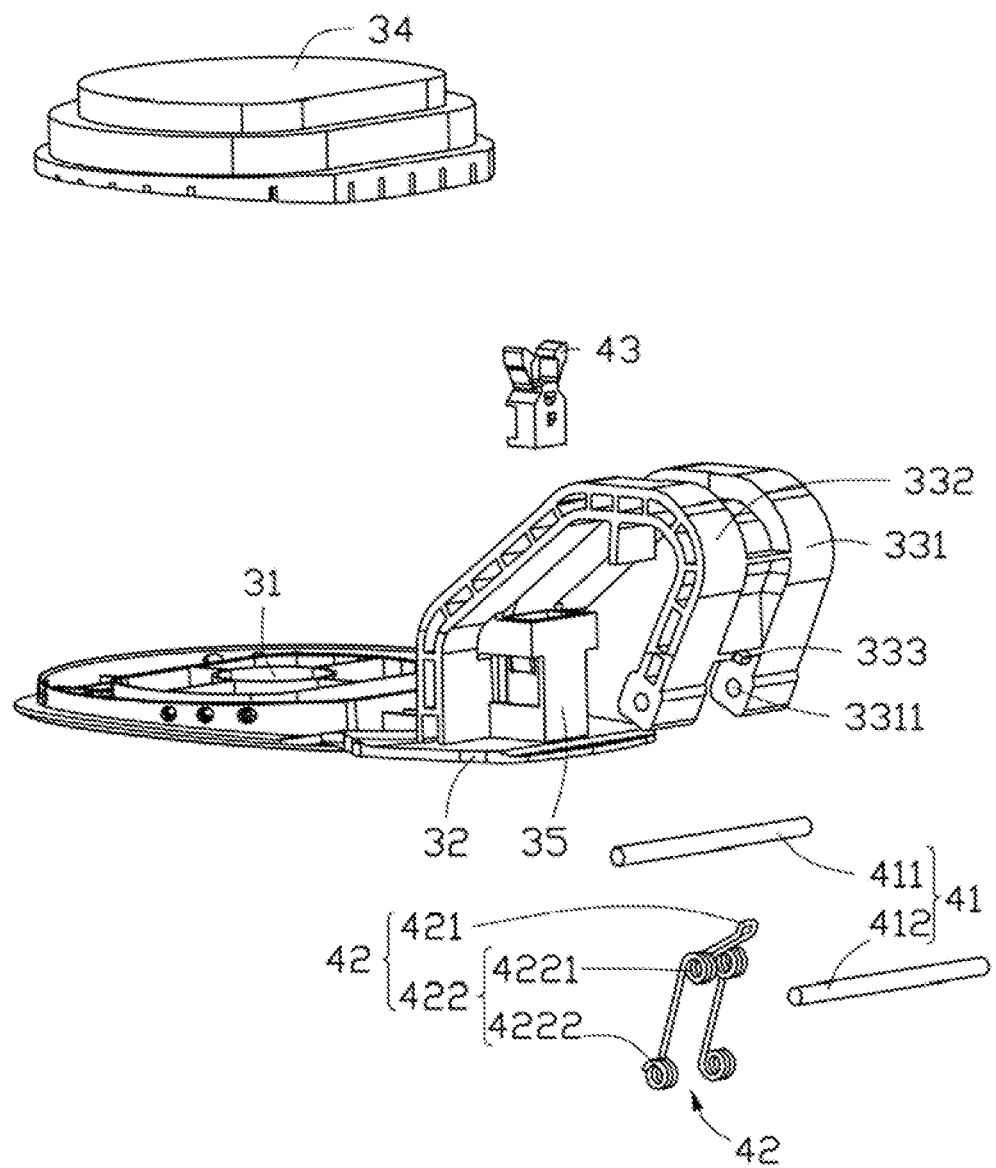
FIG. 4 is an exploded, isometric view of the cover and the snap unit in FIG. 3.
Figure 5:
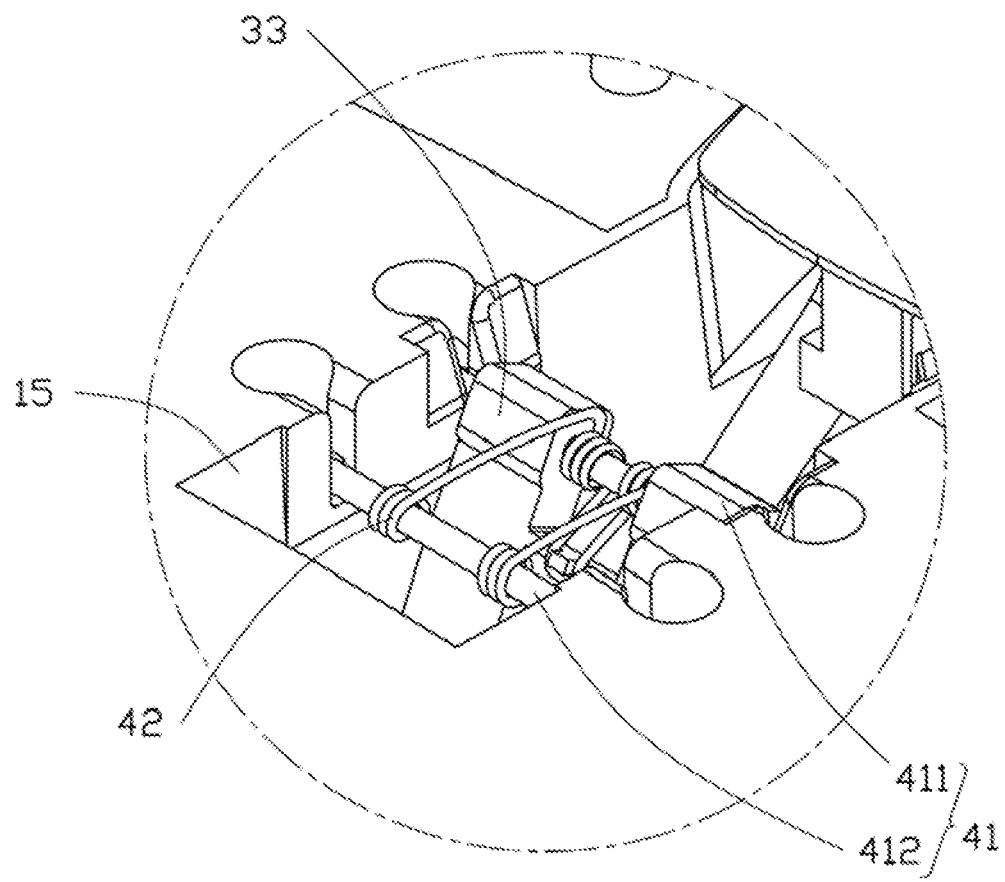
FIG. 5 is an enlarged view of the circle V area in FIG. 1.

Referring to FIG. 3 to FIG. 5, the cover 30 includes a covering part 31, an elastic part 32, and a bending part 33. The covering part 31 has an adaptive shape relative to the charging port 211 of the charging gun base 20 to completely cover the charging port 211. Thus, the covering part 31 can completely cover the charging port 211. The elastic part 32 extends outwards from an end of the covering part 31. One end of the bending part 33 is mounted on the elastic part 32, the other end of the bending part 33 is rotatably coupled on the front shell 11. In the exemplary embodiment, the bending part 33 is substantially shaped as a letter "C". The opening of the letter "C" faces away from the front shell 11.

The bending part 33 includes two branches 331. Each branch 331 is substantially shaped as a letter "C". The two branches 331 are abreast and positioned at the same side of the elastic part 32. The two branches 331 are apart from each other. One end of each branch 331 is coupled on the elastic part 32, and the other end of each branch 331 is rotatably coupled on the front shell 11 through the snap unit 40. The bending part 33 further includes an enhancing board 332. The enhancing board 332 is positioned between and connects the two branches 331, thereby enhancing strength of the bending part 33.

The cover 30 further includes an elastic member 34. The elastic member 34 is positioned on the covering part 31. The elastic member 34 faces the charging gun base 20. The elastic member 34 is configured to seal the charging gun base 20. The elastic member 34 is formed on the covering part 31 by injection molding. When the covering part 31 covers the charging port 211, the elastic member 34 sinks into the charging port 211 and is engaged with the charging port 211.

The cover 30 further includes a receiving part 35. The receiving part 35 is mounted on the elastic part 32. The receiving part 35 is hollow.

The snap unit 40 includes a shaft unit 41 and a torsion spring 42. The shaft unit 41 is mounted on the case 10. One end of the torsion spring 42 is sheathed onto the shaft unit 41, and the other end of the torsion spring 42 is coupled on the cover 30. The torsion spring 42 applies a torque on the cover 30 relative to the case 10, thereby the cover 30 is under continuous pressure to expose the charging gun base 20.

The shaft unit 41 is coupled on the front shell 11. The shaft unit 41 is positioned upon the chamber 15. One end of each branch 331 away from the covering part 31 is rotatably sheathed onto the shaft unit 41. Specifically, a shaft hole 3311 is defined on each branch 331. The shaft unit 41 is inserted and is rotatable in the shaft hole 3311.

The torsion spring 42 includes a retaining ring 421 and two socket ring units 422. The retaining ring 421 is detachably coupled to the cover 30. Specifically, the cover 30 includes a buckle 333. The buckle 333 is pressed against the retaining ring 421. In the exemplary embodiment, the buckle 333 is positioned on the enhancing board 332. The two socket ring units 422 are positioned between the two branches 331. The shaft unit 41 is inserted in the two socket ring units 422.

In the exemplary embodiment, the shaft unit 41 includes a first shaft 411 and a second shaft 412. The first shaft 411 and the second shaft 412 are mounted on the front shell 11. The first shaft 411 and the second shaft 412 are on the chamber 15. The first shaft 411 and the second shaft 412 are parallel to but separated from each other. Each branch 331 is rotatably sheathed onto the first shaft 411 through the shaft hole 3311.

Each socket ring unit 422 includes a first socket ring 4221 and a second socket ring 4222. Each first socket ring 4221 is positioned between one of the two second socket rings 4222 and the retaining ring 421. The two first socket rings 4221 are positioned between the two branches 331. The first shaft 411 is inserted in the two first socket rings 4221. The second shaft 412 is inserted in the two second socket rings 4222.

Figure 6:
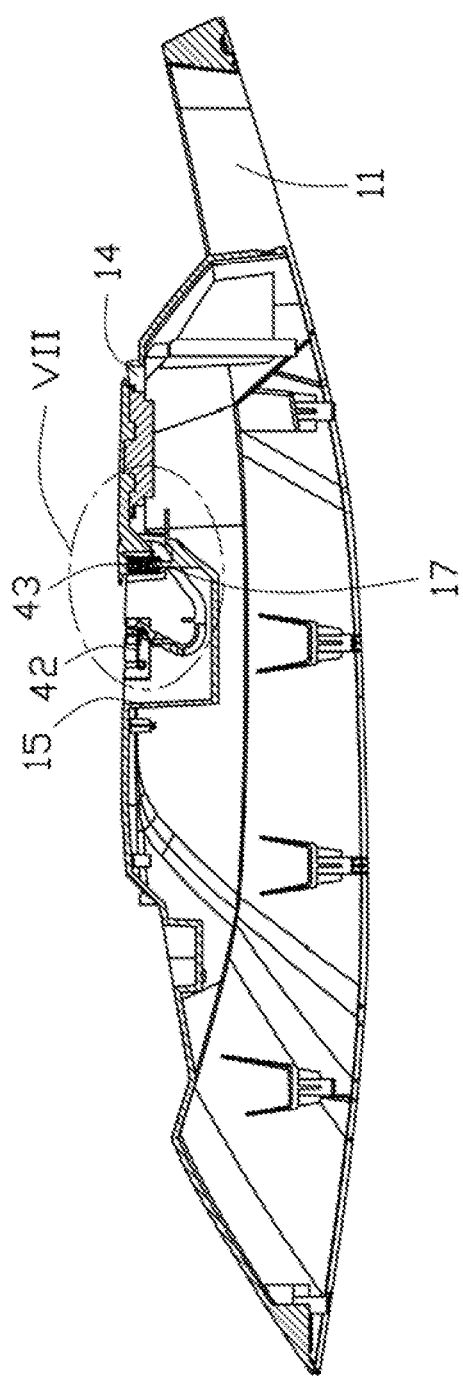
FIG. 6 is a cross-section view of part of the charging pile in FIG. 1, taken along the line VI-VI.
Figure 7:
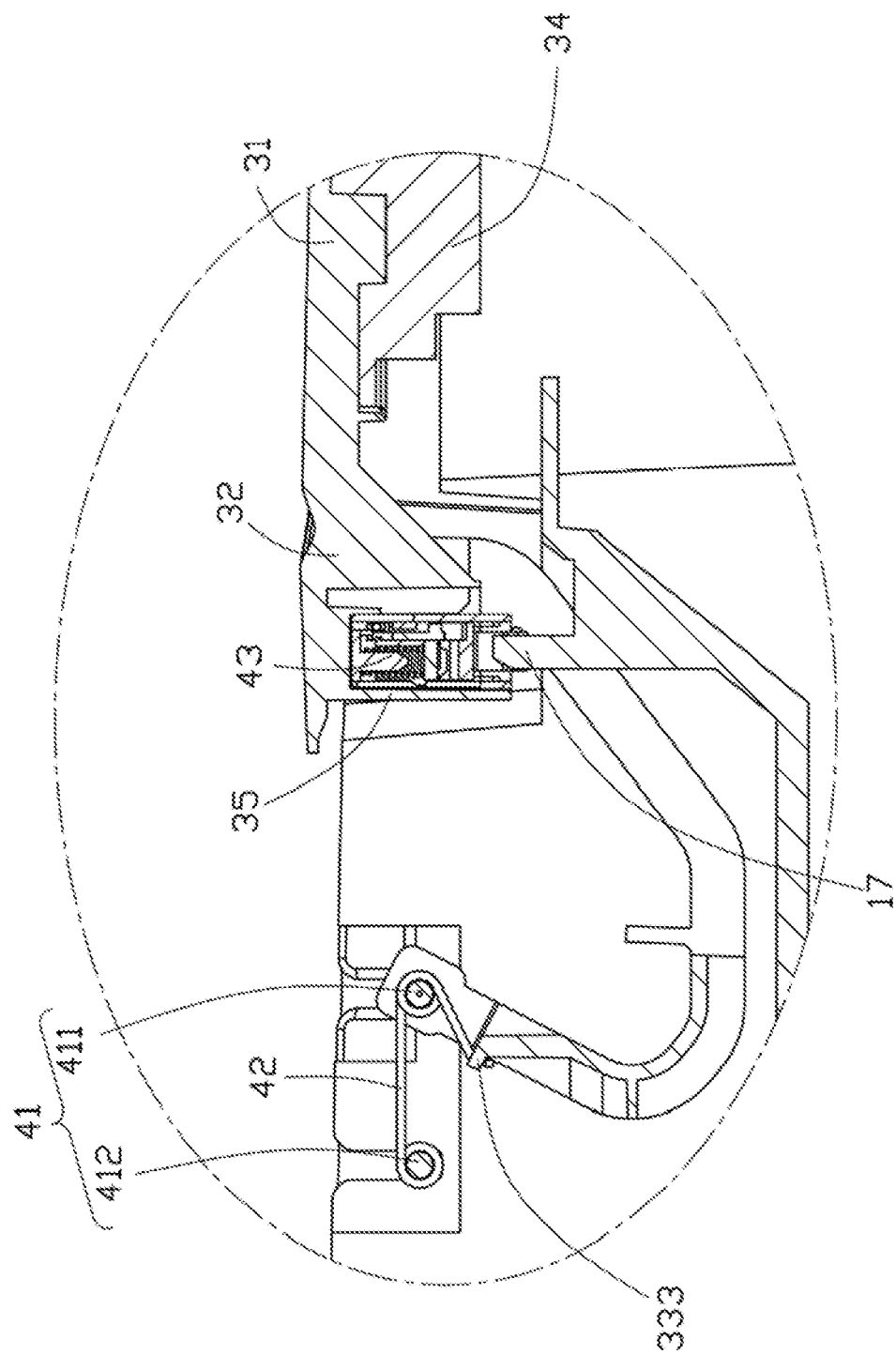
FIG. 7 is an enlarged view of the circle VII area in FIG. 6.

Referring to FIG. 6 and FIG. 7, the snap unit 40 further includes a button 43. The button 43 is positioned in the receiving part 35. The button 43 is configured to open or close the cover 30. The front shell 11 further includes a hook 17. The hook 17 is formed in the chamber 15. The hook 17 extends upwards from a bottom surface of the chamber 15. When the cover 30 is rotated to cover the charging gun base 20 and the button 43 is pressed under an external force, the button 43 is engaged with the hook 17, thereby overcoming the torque of the torsion spring 42 to keep the cover 30 covering the charging gun base 20. When the button 43 is pressed again, the button 43 releases the hook 17, thereby the cover 30 is returned to expose the charging gun base 20. When the cover 30 covers the charging gun base 20, the button 43 is positioned between the cover 30 and the front shell 11.

The cover 30 of the charging pile 100 of the present disclosure is rotatably coupled onto the case 10. When the charging pile 100 is idle, the cover 30 can keep covering the charging gun base 20, totally preventing ingress of water or moisture.

The embodiments shown and described above are only examples. Many details are often found in the art such as the other features of the charging pile. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A charging pile, comprising:
   a case;
   a charging gun base received in the case, and the charging gun base exposed from the case;
   a snap unit mounted on the case, comprising:
     a shaft unit coupled onto the case; and
     a torsion spring, one end of the torsion spring sheathed onto the shaft unit, and the other end of the torsion spring pressed against the cover;
   a cover coupled onto the case through the snap unit; and
   wherein the cover is rotatable relative to the case, thereby covering or exposing the charging gun base; and
   wherein the torsion spring applies a torque on the cover to expose the charging gun base;
   the torsion spring comprises a retaining ring and two socket ring units, the cover comprises a buckle formed thereon, and the buckle is pressed against the retaining ring; the cover is rotatably sheathed onto the shaft unit, and the shaft unit is inserted in the two socket ring units.

2. The charging pile of claim 1,
   wherein the snap unit further comprises a button mounted on the case, and the case comprises a hook;
   wherein when the cover is rotated to cover the charging gun base and the button is pressed under an external force, the button is engaged with the hook, thereby overcoming the torque of the torsion spring to keep the cover covering the charging gun base; and wherein when the button is pressed again, the button releases the hook, thereby the cover is returned to expose the charging gun base.

3. The charging pile of claim 2, wherein the cover comprises:

a covering part configured to cover the charging gun base;

an elastic part extending outwards from an end of the covering part; and a bending part, one end of the bending part coupled onto the elastic part, and the other end of the bending part sheathed onto the shaft unit; and wherein the bending part is rotatable relative to the shaft unit.

4. The charging pile of claim 3, wherein a chamber is defined on the case, the chamber being recessed inwards from an outside surface of the case;

wherein the hook is positioned in the chamber, the hook extends upwards from a bottom surface of the chamber;

wherein the shaft unit is on the chamber; and wherein when the cover is covering the charging gun base, the bending part is received in the chamber.

5. The charging pile of claim 4, wherein an opening is defined on the case, the opening is configured to expose the charging gun base; and wherein the opening is located beside the chamber, and a baffle is provided to separate the opening and the chamber.

6. The charging pile of claim 3, wherein the bending part comprises two branches, the two branches are abreast and apart from each other;

wherein one end of each branch is coupled onto the elastic part, and the other end of each branch is rotatably sheathed onto the shaft unit; and wherein the torsion spring is between the two branches.

7. The charging pile of claim 6, wherein the bending part further comprises an enhancing board, the enhancing board is between the two branches to connect the two branches.

8. The charging pile of claim 3, wherein the cover further comprises an elastic member, the elastic member is on the covering part; and wherein the elastic member faces the charging gun base and is configured to seal the charging gun base.

9. The charging pile of claim 8, wherein the elastic member is formed on the covering part by injection molding.

10. The charging pile of claim 3, wherein the cover further comprises a receiving part, the receiving part is coupled onto the elastic part, and the receiving part faces the case; and wherein the receiving part is hollow, and the button is mounted and received in the receiving part.

11. The charging pile of claim 1, wherein the shaft unit comprises a first shaft and a second shaft, the first shaft and the second shaft are mounted on the case, the first shaft and the second shaft are parallel and separated from each other; and wherein each socket ring unit comprises a first socket ring and a second socket ring; and wherein the cover is rotatably sheathed onto the first shaft, the first shaft is inserted in the first socket rings, and the second shaft is inserted in the second socket rings.

12. The charging pile of claim 1, further comprising a holder, and wherein the holder is mounted and received in the case, and the charging gun base is mounted on the holder.

13. The charging pile of claim 1, wherein the case comprises a front shell and a rear shell, the front shell and the rear shell are relatively coupled; and;

wherein a cavity is defined between the front shell and the rear shell, and the charging gun base is in the cavity.

14. The charging pile of claim 13, wherein the charging gun base is mounted on the rear shell, and the charging gun is exposed from the front shell; and wherein the cover is coupled onto the front shell, and the cover is rotatable relative to the front shell.

* * * * *